Aug. 28, 1951     R. E. ABERNATHY     2,566,013
AUTOMATIC HOG CRATE
Filed Feb. 28, 1949     2 Sheets-Sheet 1
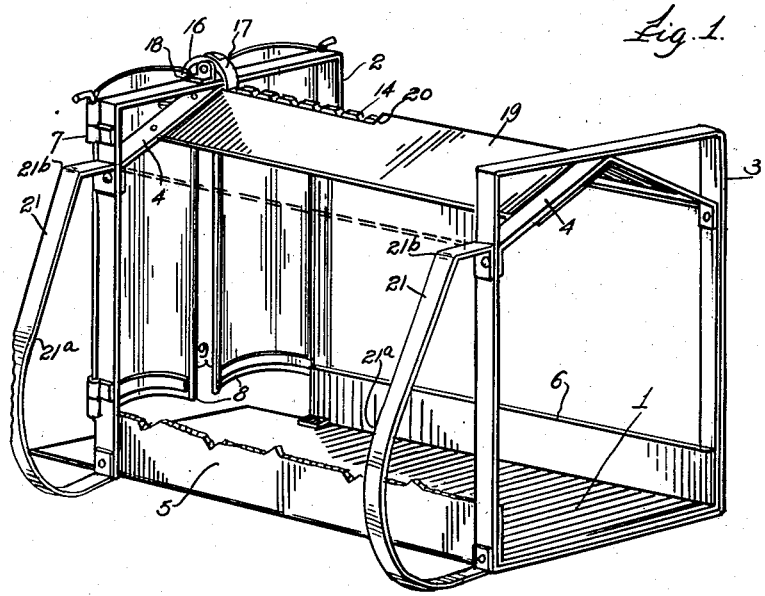
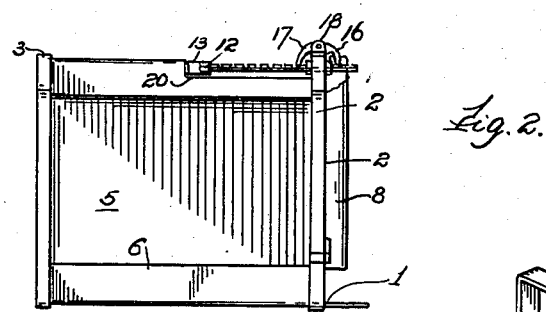
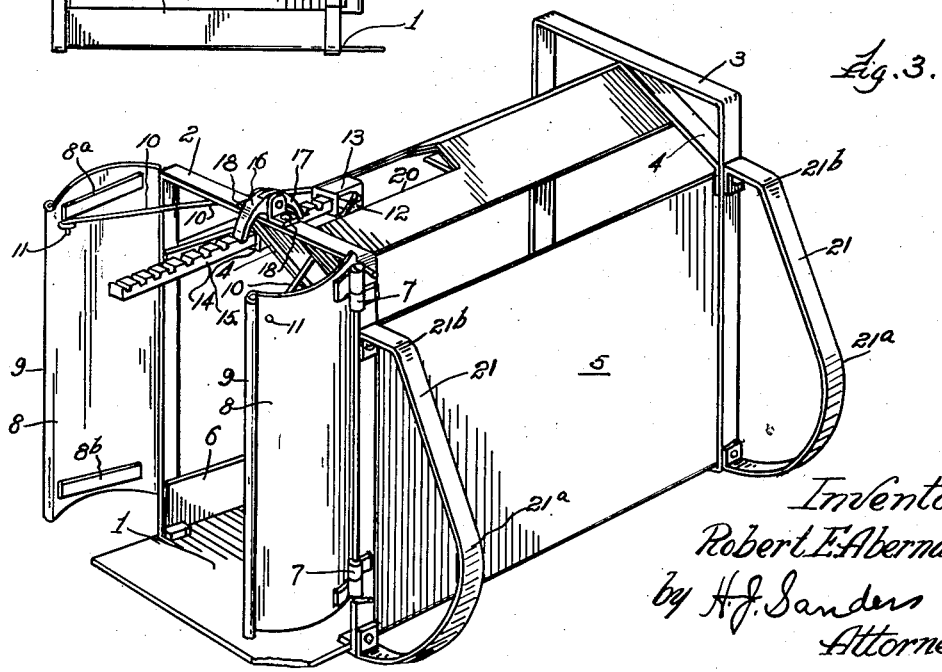
Inventor:
Robert E. Abernathy,
by H. J. Sanders
Attorney.

Aug. 28, 1951 R. E. ABERNATHY 2,566,013
AUTOMATIC HOG CRATE
Filed Feb. 28, 1949 2 Sheets-Sheet 2

Inventor:
Robert E. Abernathy.
by H. J. Sanders
Attorney.

Patented Aug. 28, 1951

2,566,013

UNITED STATES PATENT OFFICE 2,566,013

AUTOMATIC HOG CRATE

Robert E. Abernathy, Concord, Ill.

Application February 28, 1949, Serial No. 78,857

1 Claim. (Cl. 119—103)

This invention relates to restraining devices and more particularly to such devices constructed especially for catching and detaining swine for inoculation or for other purpose. Another object of the device is to provide a device of the said character that is automatic in operation, that will operate efficiently to catch and hold pigs as well as hogs of all sizes with equal facility.

A further object is to provide a hog crate that in use may be moved to such position as to hold the animal so that it is helpless to struggle free thereby greatly reducing the difficulty of performing the operation or treatment in hand.

A still further object is to provide an automatic hog crate of stout construction that is composed of few parts, that is positive in operation, durable in use, of light weight, readily portable, and that is inexpensive to manufacture.

Other objects, novel features and advantages of arrangement, construction and design comprehended by the invention are hereinafter more fully pointed out or made apparent from the following description of a preferred embodiment as illustrated in the accompanying drawings wherein like reference characters denote corresponding parts throughout.

In the drawings:

Fig. 1 is a view in elevational perspective of a crate according to the instant invention.

Fig. 2 is a side elevational view, on a reduced scale, of the crate of Fig. 1.

Fig. 3 is a perspective view of the crate with adjustable parts in an altered position.

Figure 4:
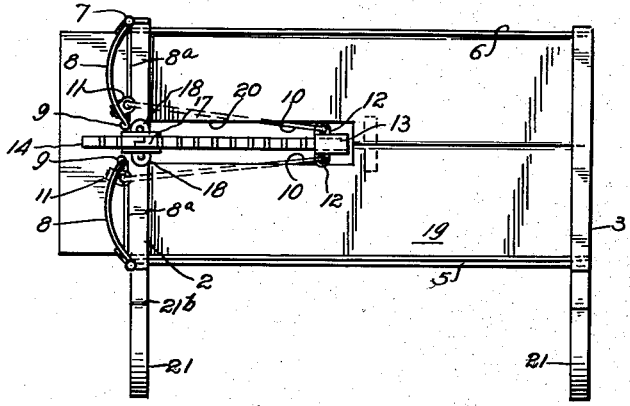
Fig. 4 is a top plan view of the crate.
Figure 5:
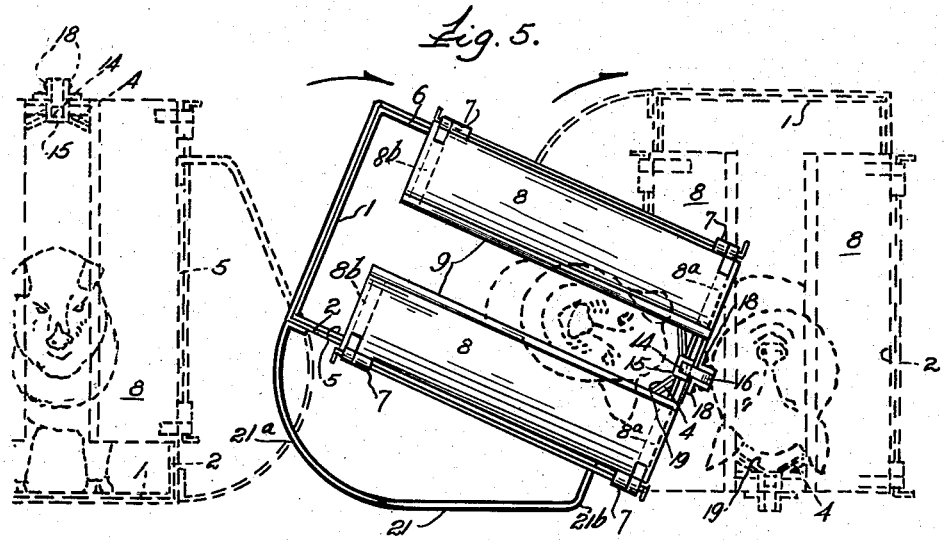
Figure 6:
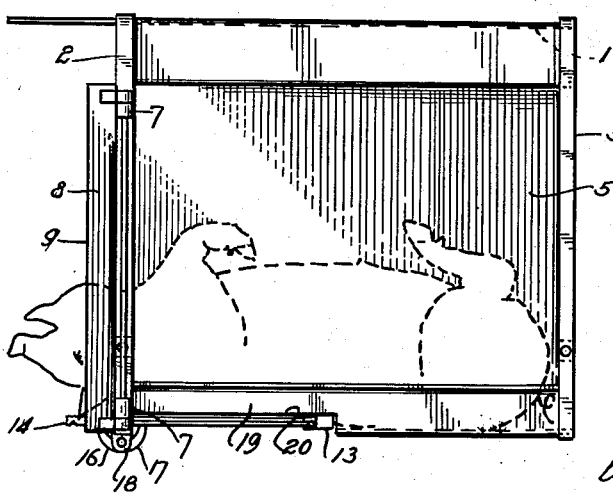

Fig. 5 embraces three positions of the crate, an upright position shown in dotted lines, an intermediate position shown in full lines, and an inverted position shown in dotted lines, all taken from one end of the crate and illustrating the crate in use, and, Fig. 6 is a side elevational view of the crate, inverted, showing the animal securely but painlessly held thereby.

The instant crate comprises a framework or body portion having a floor 1 and at one end thereof is the door frame 2 while at the opposite end of the floor 1 is a frame 3 similar in all respects to the frame 2, each frame 2 and 3 having its upright members connected to its cross member by an angular brace member 4. The upright members of the frames 2, 3 upon one side of the crate are connected by a side wall 5 extending from the floor almost to the frame cross members while the frames 2, 3 at the opposite side of the crate have their upright members connected, contiguous to the floor, by a single guard board or stringpiece 6 leaving that portion of the crate side thereabove open.

Secured by hinges 7 to the upright members of the door frame are the two doors 8 of concavo-convex cross section, the free edge 9 of each door being rolled or rounded, the concave door-faces being opposite each other in the parallel open door position shown in Fig. 3, the doors in closed position almost closing one end of the crate but with their free rolled edges spaced a slight distance apart as shown in Fig. 1.

A pair of rods 10 connect screws 11 secured to the doors 8 beneath upper door cleat 8a, a lower cleat 8b being also provided for strengthening purposes, pivotally to lugs 12 formed upon opposite sides of the casting 13 at one end of the ratch 14 operatively supported in a hanger 15 carried by the brace 4, said ratch releasably locked by the opposed pawls 16, 17 pivotally connected together and supported by the metal angles 18 secured to the cross member of the door frame 2 midway between the ends of that cross member.

Secured to the brace members 4 at the ends of the crate is an inverted trough-shaped bed 19 of lesser width than the span of a brace member 4, the lateral edges of the bed being equidistant from the sides of the crate, the bed being cut away or slotted upon both sides of its axis, as at 20, from its end adjacent the door frame to a point at approximately its longitudinal center, this slot being of a width and extent to provide clearance for the ratch 14 and casting 13 as they may be moved back and forth as the doors are opened and closed.

Secured to the upright members of the frames 2 and 3 upon a common side of the crate are the rockers 21 that extend from floor level to approximately the level of the upper edge of the side wall 5. The crate is so constructed that it can readily be moved from its upright position, through the medium of its rockers, to inverted position and there rested as desired and thereafter moved back to upright or normal position. In use the pawls are manually raised out of engagement with the ratch and the doors moved to their open positions, the opening being sufficient to permit the head of the animal to pass therebetween and the pawls again placed in engagement with the ratch. The animal is now driven into the crate from the wide open end and immediately endeavors to pass through the doors which permit only the passage of the head and the animal is securely held. The crate is now moved to inverted position, the animal being moved into the bed 19, his body sliding upon the side wall 5. The animal has now been moved from the upright position, Fig. 5, through the intermediate position to the final position there shown, the latter position also shown in Fig. 6.

Looking at the crate from the door end the rockers are arranged upon the right hand side at the crate ends, each rocker being bulged or curved outwardly from the floor portion of the crate approximately to a point 21a and therebeyond inclined toward the crate at approximately a 45 degree angle to a point 21b from which point inwardly the rocker is terminally disposed at a 90 degree angle to the crate. The purpose of the rockers is to facilitate the movement of the crate, with the animal, laterally to the right upon the rockers to a final inverted position with the animal upon his back with feet in the air and helpless to struggle effectually to other position and in this position he lends himself readily to the performance of the operation in hand without danger of injury to himself or to the operator. When it is desired to release the animal the crate is again moved to upright position and the pawls released from the ratch permitting the animal to pass through the doors. For castrating and numerous other operations the crate may be stopped at the intermediate position, Fig. 5, with the animal lying on his side with his feet tilted slightly upwardly.

What is claimed is:

In an automatic animal crate, a door frame, an end frame, a side wall connecting said door frame and end frame, a floor connecting said door frame and end frame, a trough-shaped bed connecting said door frame and end frame spaced from said side wall, rockers secured to said door frame and end frame, and means carried by one of said frames for clamping an animal, said means including concavo-convex doors secured to said door frame.

ROBERT E. ABERNATHY.

REFERENCES CITED

The following references are of record in the file of this patent:

UNITED STATES PATENTS

| Number | Name | Date |
|---|---|---|
| 556,778 | Schneider | Mar. 24, 1896 |
| 729,619 | Luensmann | June 2, 1903 |
| 1,187,017 | Snow | June 13, 1916 |
| 1,348,093 | D'Egilbert et al. | July 27, 1920 |
| 1,444,769 | Abernathy | Feb. 13, 1923 |
| 1,704,054 | Miller | Mar. 5, 1929 |
| 1,716,281 | Pavey | June 4, 1929 |